United States Patent
Chang et al.

(10) Patent No.: US 12,436,408 B2
(45) Date of Patent: Oct. 7, 2025

(54) WEARABLE DEVICE

(71) Applicant: HTC Corporation, Taoyuan (TW)

(72) Inventors: Li-Hsun Chang, Taoyuan (TW); Yu-Hsun Chung, Taoyuan (TW)

(73) Assignee: HTC Corporation, Taoyuan (TW)

( * ) Notice: Subject to any disclaimer, the term of this patent is extended or adjusted under 35 U.S.C. 154(b) by 467 days.

(21) Appl. No.: 17/985,160

(22) Filed: Nov. 11, 2022

(65) Prior Publication Data

US 2024/0160037 A1    May 16, 2024

(51) Int. Cl.
*G02C 5/12*    (2006.01)
*G02C 11/00*    (2006.01)

(52) U.S. Cl.
CPC .............. *G02C 5/122* (2013.01); *G02C 11/10* (2013.01)

(58) Field of Classification Search
CPC .... G02C 5/122; G02C 11/10; G02C 2200/26; G02C 5/12
See application file for complete search history.

(56) References Cited

U.S. PATENT DOCUMENTS

| | | | | |
|---|---|---|---|---|
| 5,971,538 A * | 10/1999 | Heffner | ................... | G02C 5/122 351/137 |
| 6,135,592 A * | 10/2000 | Preutz | .................... | G02C 5/122 351/111 |
| 10,690,936 B2 | 6/2020 | Heisey | | |
| 2001/0055093 A1* | 12/2001 | Saitoh | ..................... | G02C 5/126 351/137 |
| 2002/0067461 A1 | 6/2002 | Bell | | |
| 2002/0101561 A1* | 8/2002 | Miceli | ..................... | G02C 5/122 351/71 |
| 2002/0171806 A1* | 11/2002 | Baumgarten | ............ | A61B 3/11 351/227 |
| 2020/0267378 A1* | 8/2020 | Kuronuma | ............... | H04N 5/64 |
| 2021/0215951 A1* | 7/2021 | Cao | ......................... | G02C 5/122 |

FOREIGN PATENT DOCUMENTS

| | | |
|---|---|---|
| CN | 111965827 | 11/2020 |
| CN | 213814166 | 7/2021 |
| TW | 202107160 | 2/2021 |

OTHER PUBLICATIONS

"Office Action of Taiwan Counterpart Application", issued on Oct. 4, 2023, p. 1-p. 5.

* cited by examiner

*Primary Examiner* — Pinping Sun
*Assistant Examiner* — Gabriel A Sanz
(74) *Attorney, Agent, or Firm* — JCIPRNET

(57) ABSTRACT

A wearable device includes a body, a nose pad frame, a first elastic element and a fixing element. The body has a bridge. The nose pad frame is movably arranged at the bridge. The first elastic element is arranged between the bridge and the nose pad frame. The fixing element is movably arranged at the bridge for fixing the nose pad frame or allowing the nose pad frame to move steplessly.

6 Claims, 7 Drawing Sheets

WEARABLE DEVICE

BACKGROUND

Technical Field

The application relates to a wearable device, and in particular, to a wearable device that adjusts the height of the nose pad frame.

Description of Related Art

With the rapid advancement of current technology, the types and functions of head-mounted display devices are also increasingly diversified. For a thin and light glasses-type display device, the proportion of the support force borne by the nose pad frame is much higher due to the lack of support such as headbands and masks. In addition, since the height of the bridge of the nose is different for each person, the image displayed by the glasses-type display device may not exactly correspond to the eyes of each user, so that a satisfactory viewing experience cannot be provided.

SUMMARY

The application provides a wearable device to provide the function of adjusting the height of the nose pad frame.

The wearable device of the application includes a body, a nose pad frame, a first elastic element and a fixing element. The nose pad frame is movably arranged at the bridge. The first elastic element is arranged between the bridge and the nose pad frame. The fixing element is movably arranged at the bridge for fixing the nose pad frame or allowing the nose pad frame to move steplessly.

Based on the above, in the wearable device of the application, the height-adjustable nose pad frame is arranged on the bridge and can be fixed, so that different users can obtain a comfortable wearing feeling and a good viewing experience.

DESCRIPTION OF THE EMBODIMENTS

Figure 1:
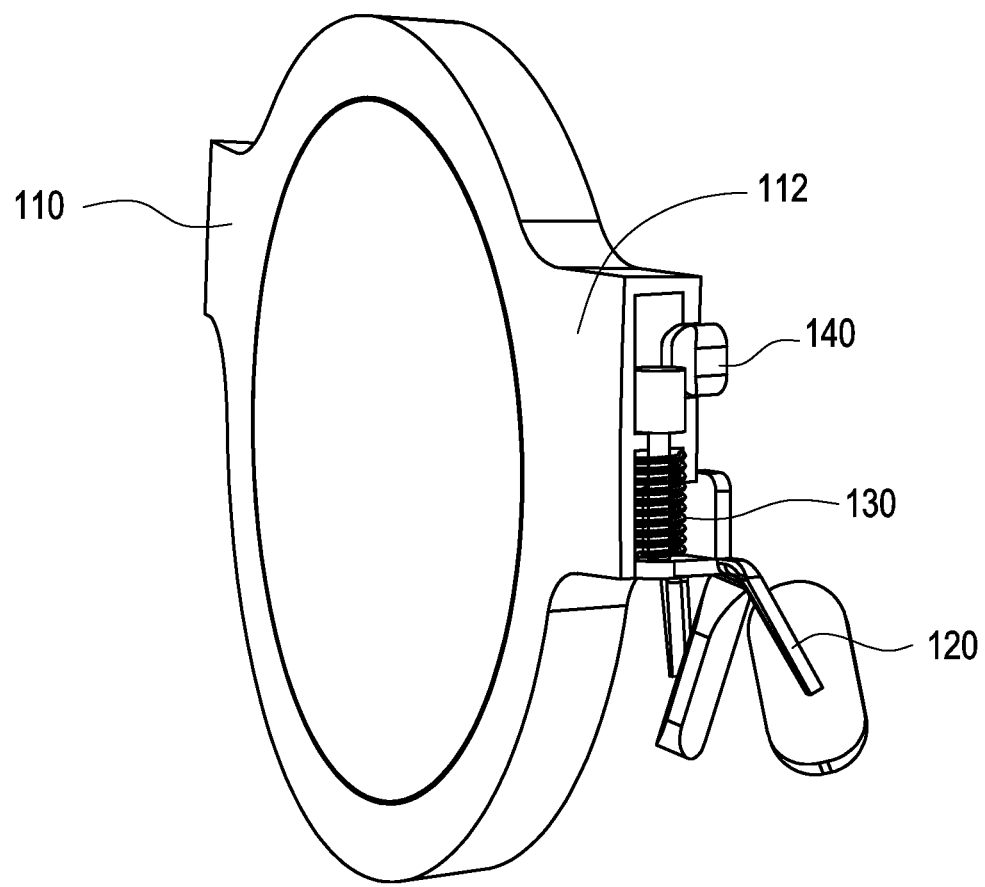
FIG. 1 is a schematic partial cross-sectional view of a wearable device according to an embodiment of the present invention.

FIG. 1 is a schematic partial cross-sectional view of a wearable device according to an embodiment of the present invention. Referring to FIG. 1, the wearable device 100 of the embodiment includes a body 110, a nose pad frame 120, a first elastic element 130, and a fixing element 140. The body 110 has a bridge 112 corresponding to the bridge of the nose. For convenience of illustration, other parts of the body 110 are omitted in FIG. 1. The nose pad frame 120 is movably arranged at bridge 112. The first elastic element 130 is arranged between the bridge 112 and the nose pad frame 120. The fixing element 140 is movably arranged at the bridge 112 for fixing the nose pad frame 120 or allowing the nose pad frame 120 to move steplessly. In the embodiment, the wearable device 100 is a glasses-type display device. In other embodiments, the wearable device 100 may also be a head-mounted display device with a headband or other display devices requiring the nose pad frame 120.

In FIG. 1, the fixing element 140 is not in contact with the nose pad frame 120. At this time, if the user wears the wearable device 100, the user's nose will touch the nose pad frame 120. If the bridge of the nose of the user is high, the nose pad frame 120 will be pushed up by the bridge of the nose of the user.

Figure 2:
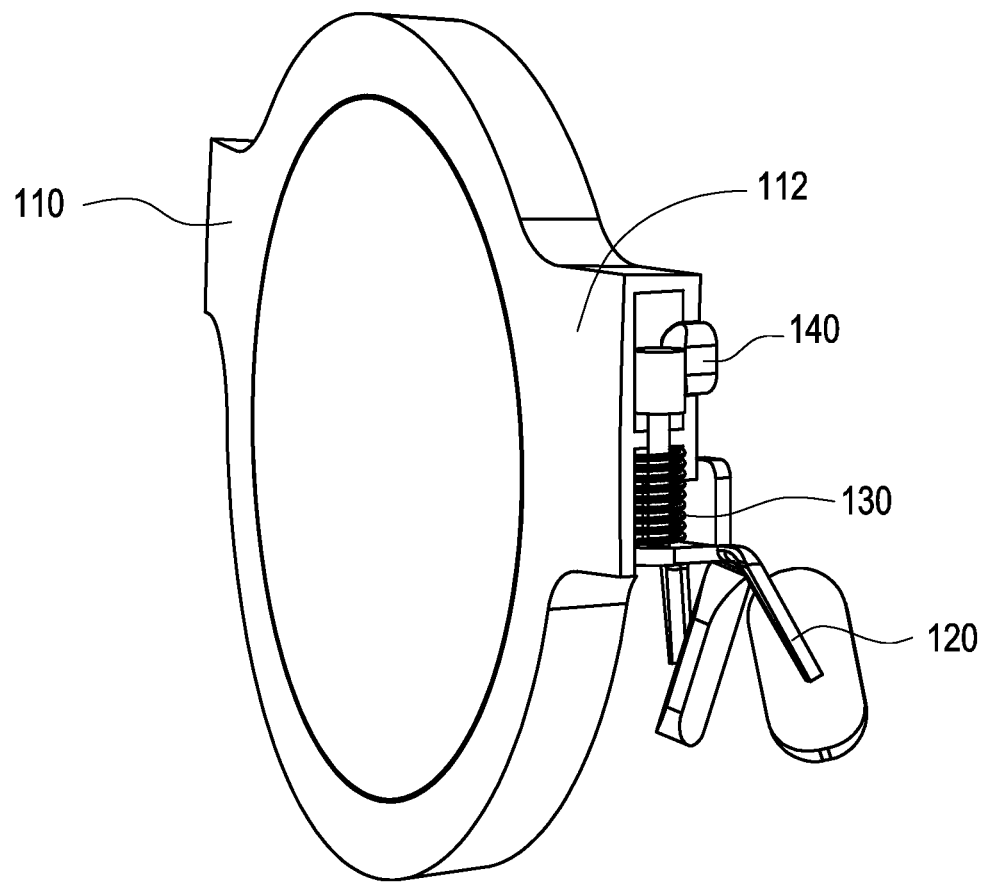
FIG. 2 is a schematic diagram of another state of the wearable device in FIG. 1.

FIG. 2 is a schematic diagram of another state of the wearable device in FIG. 1. Referring to FIG. 2, when the nose pad frame 120 is pushed up by the bridge of the user's nose to the position shown in FIG. 2 and stops moving, that is, after the user has worn the wearable device 100 in the most comfortable state, the fixing element 140 can be moved to contact the nose pad frame 120 and fix the nose pad frame 120 to maintain a better wearing state. In other words, the height adjustment method of the nose pad frame 120 is stepless, that is, the height value that can be adjusted is continuous, not segmented.

In the wearable device 100 of the embodiment, the bridge 112 can be pushed to an appropriate height by the bridge of the user's nose during the wearing action of the user, and the fixing element 140 can fix the bridge 112 at the appropriate height. Therefore, even if different users have different heights of the bridge of the nose, a better wearing feeling can be obtained when wearing the wearable device 100 of the embodiment. In other words, the user can directly look at the images displayed by the wearable device 100 and obtain a good viewing experience.

Figure 3:
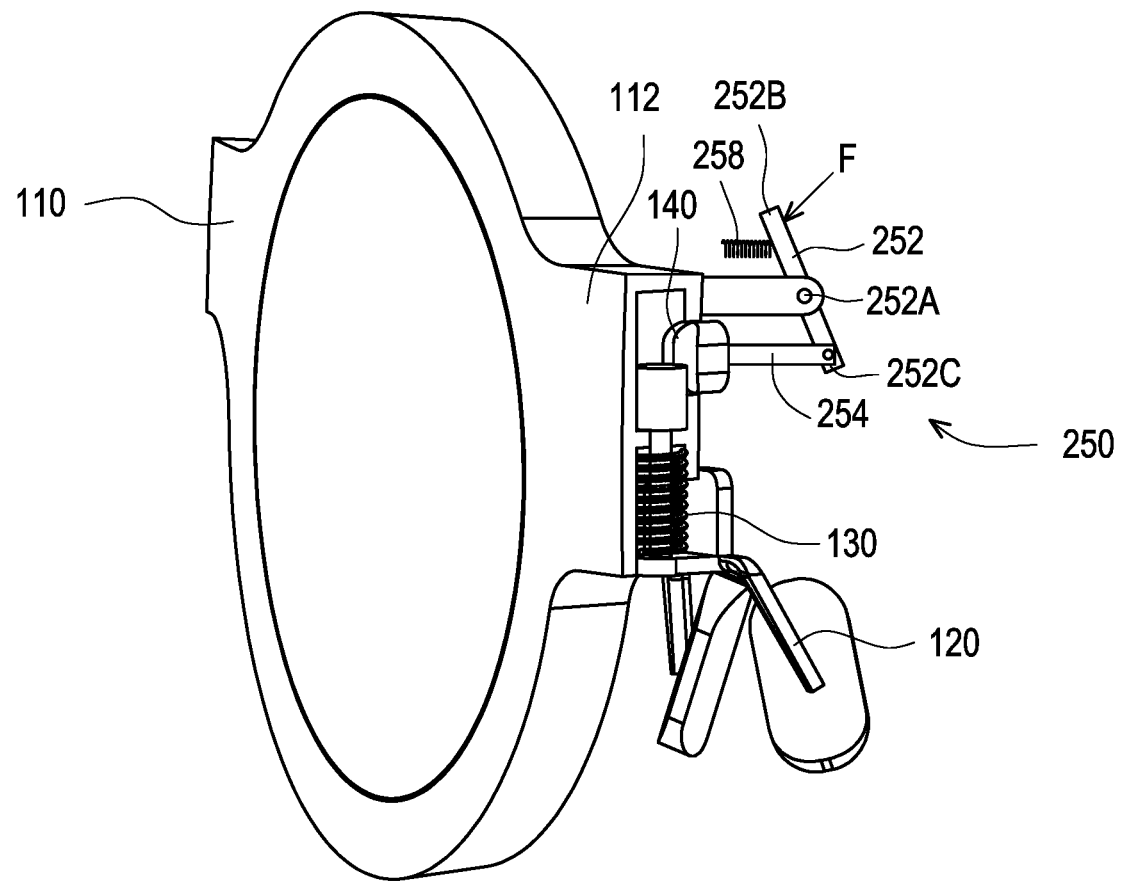
FIG. 3 is a schematic partial cross-sectional view of a wearable device according to another embodiment of the present invention.
Figure 4:
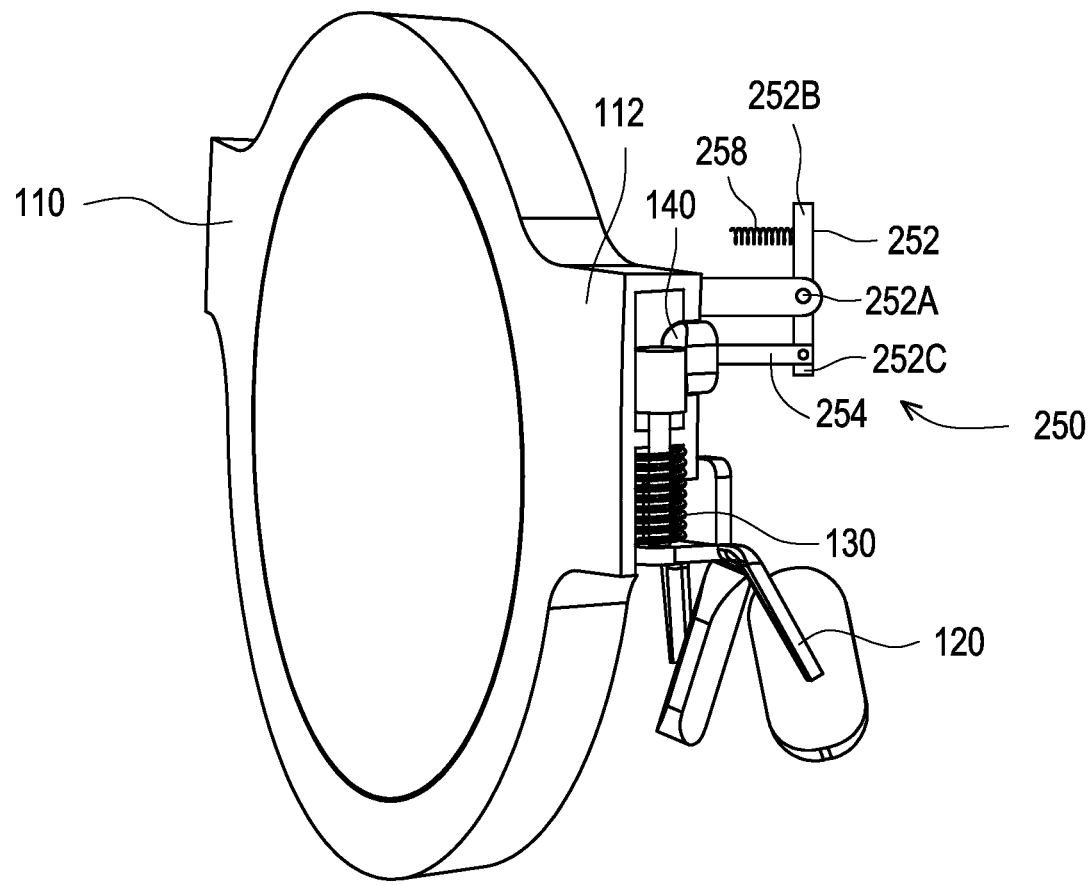
FIG. 4 is a schematic diagram of another state of the wearable device in FIG. 3.

FIG. 3 is a schematic partial cross-sectional view of a wearable device according to another embodiment of the present invention. FIG. 4 is a schematic diagram of another state of the wearable device in FIG. 3. Referring to FIG. 3 and FIG. 4, the wearable device 200 in the embodiment is similar to the wearable device 100 in FIG. 1, and only the differences between the two are described here. The wearable device 200 of the embodiment further includes a switch module 250 assembled to the body 110 for moving the fixing element 140. That is to say, the wearable device 200 of the embodiment provides a switch module 250. The user does not need to directly touch the fixing element 140 located inside the bridge 112 and is difficult to touch, but moves the fixing element 140 through the switch module 250 to adjust and fix the height of the nose pad frame 120.

In the embodiment, the switch module 250 includes a first connecting rod 252 and a second connecting rod 254. The first connecting rod 252 has a pivot joint 252A, a force receiving portion 252B and a connecting portion 252C. The pivot joint 252A pivots the body 110 and is located between the force receiving portion 252B and the connecting portion 252C. The force receiving portion 252B is used to receive, for example, an external force F applied by the user to make the first connecting rod 252 rotate. When the user pushes the force receiving portion 252B in one direction, the connecting portion 252C of the first connecting rod 252 will move in the opposite direction. Both ends of the second connecting rod 254 are respectively connected to the connecting portion 252C and the fixing element 140.

When the user pushes the force receiving portion 252B toward the fixing element 140, the connecting portion 252C of the first connecting rod 252 will move away from the fixing element 140. At the same time, the connecting portion 252C also drives the second connecting rod 254 to move away from the fixing element 140, so that the fixing element 140 does not touch the nose pad frame 120 and allows the nose pad frame 120 to move steplessly, as shown in FIG. 3.

When the user pushes the force receiving portion 252B away from the fixing element 140, the connecting portion 252C of the first connecting rod 252 will move toward the fixing element 140. At the same time, the connecting portion 252C also drives the second connecting rod 254 to move towards the fixing element 140, so that the fixing element 140 contacts and fixes the nose pad frame 120, as shown in FIG. 4.

In the embodiment, the switch module 250 further includes a second elastic element 258, connected between the body 110 and the force receiving portion 252B for resetting the first connecting rod 252 when the external force F is not applied. In FIG. 3 and FIG. 4, the second elastic element 258 is not in direct contact with the body 110, but in fact the body 110 provides support for the second elastic element 258 so that the second elastic element 258 applies elastic force to the force receiving portion 252B. After the user finishes adjusting the height of the nose pad frame 120, as long as the user releases the second connecting rod 254 without touching the force receiving portion 252B, the second elastic element 258 will exert elastic force on the force receiving portion 252B. In this way, the force receiving portion 252B is moved away from the fixing element 140. At the same time, the connecting portion 252C of the first connecting rod 252 will move towards the fixing element 140, and the connecting portion 252C will also drive the second connecting rod 254 to move towards the fixing element 140, so that the fixing element 140 contacts and fixes the nose pad frame 120.

Figure 5:
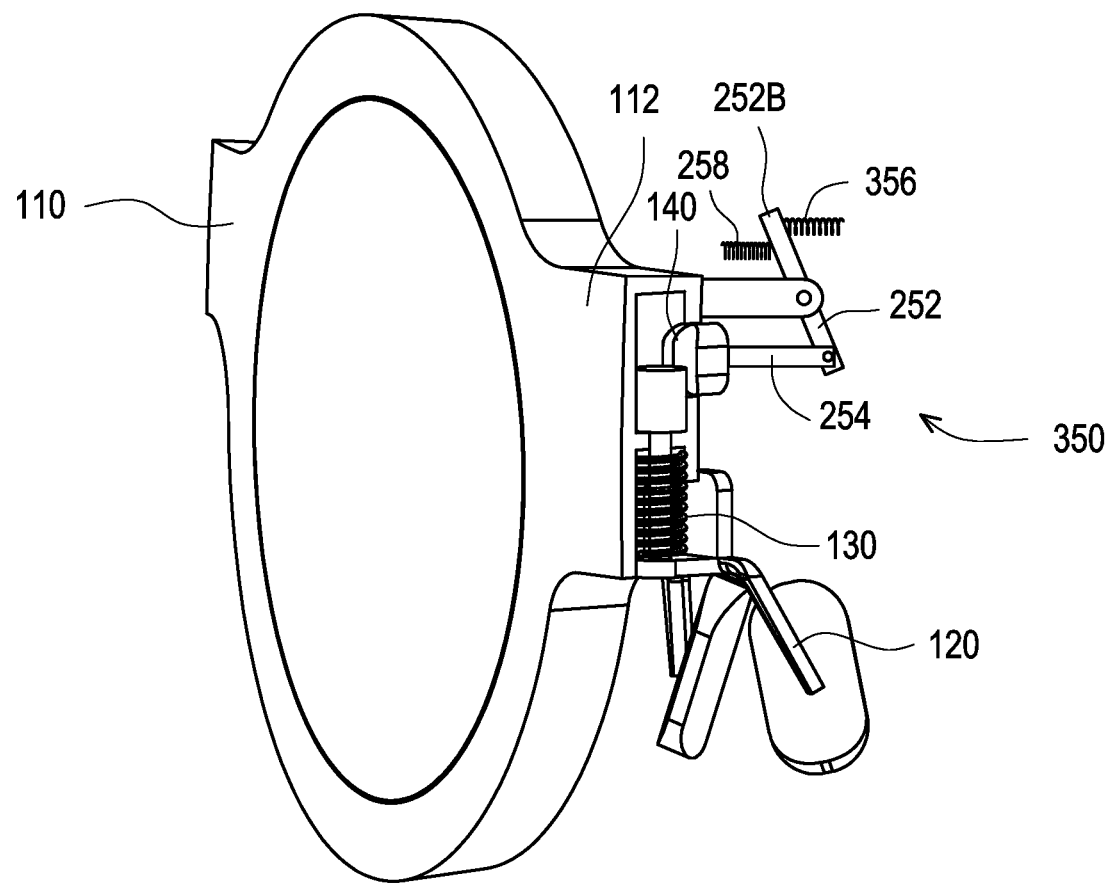
FIG. 5 is a schematic partial cross-sectional view of a wearable device according to yet another embodiment of the present invention.
Figure 6:
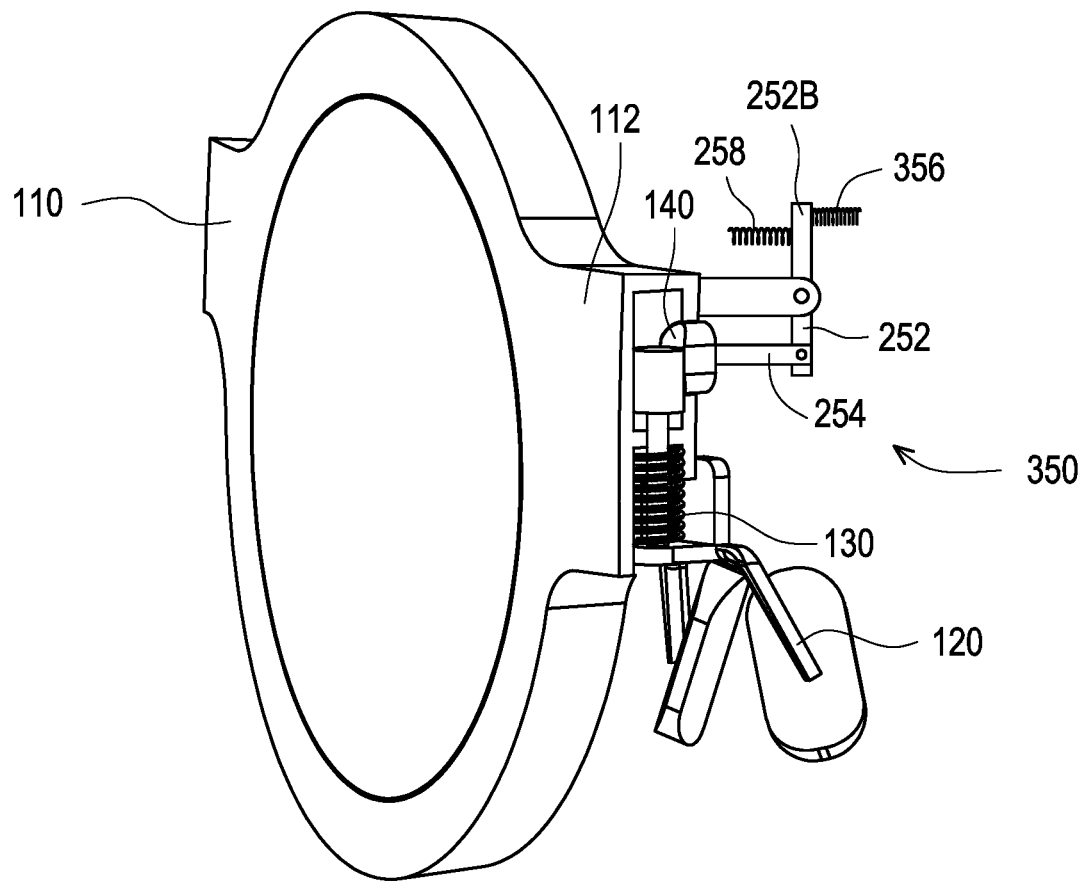
FIG. 6 is a schematic diagram of another state of the wearable device in FIG. 5.

FIG. 5 is a schematic partial cross-sectional view of a wearable device according to yet another embodiment of the present invention. FIG. 6 is a schematic diagram of another state of the wearable device in FIG. 5. Referring to FIG. 5 and FIG. 6, the wearable device 300 in the embodiment is similar to the wearable device 200 in FIG. 3, and only the differences between the two are described here. The switch module 350 of the embedment further includes a shape memory alloy element (SMA element)356, connected between the body 110 and the force receiving portion 252B for applying external force to the force receiving portion 252B. In FIG. 5 and FIG. 6, the SMA element 356 is not in direct contact with the body 110, but in fact the body 110 provides support for the SMA element 356, so that the SMA element 356 applies force to the force receiving portion 252B. Powering the SMA element 356 can increase its temperature, and the length of the SMA element 356 will also change accordingly, so it can replace the user's hand to apply external force to the force receiving portion 252B. In the embodiment, after the temperature of the SMA element 356 rises due to energization, the length of the SMA element 356 is shortened accordingly, so as to pull the force receiving portion 252B. In other embodiments, after the temperature of the SMA element 356 rises due to energization, the length of the SMA element 356 is extended accordingly to push the force receiving portion 252B.

In the embodiment, the second elastic element 258 resets the first connecting rod 252 when the SMA element 356 is powered off so that the fixing element 140 contacts and fixes the nose pad frame 120.

Figure 7:
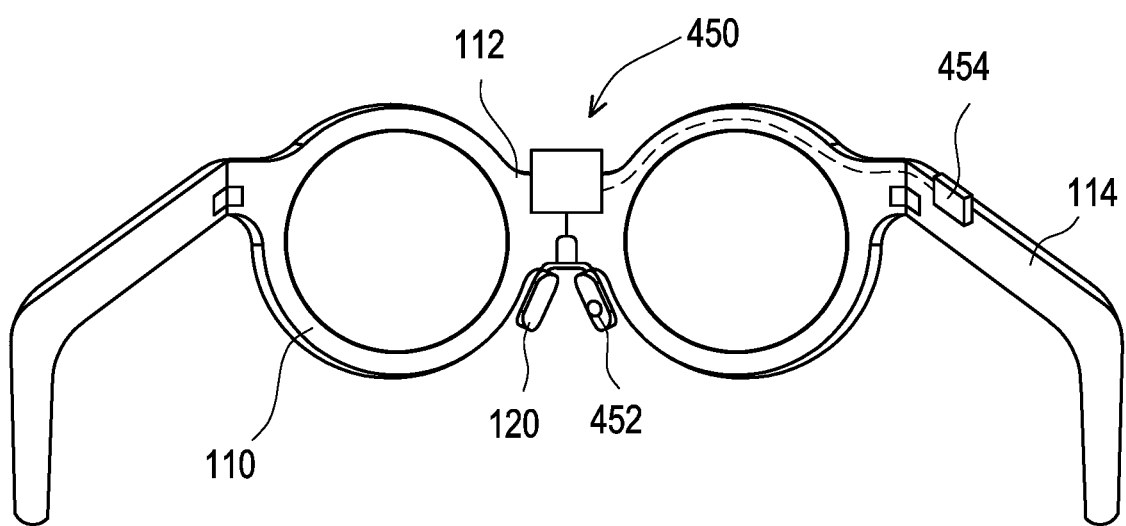
FIG. 7 is a schematic diagram of a wearable device according to another embodiment of the present invention.

FIG. 7 is a schematic diagram of a wearable device according to another embodiment of the present invention. Referring to FIG. 7, the wearable device 400 in the embodiment is similar to the wearable device 300 in FIG. 5, and only the differences between the two are described here. Referring to FIG. 5 and FIG. 7, in the embodiment, in addition to the components included in the switch module 350 shown in FIG. 5, further includes a sensor 452 for sensing whether the nose pad frame 120 is in contact with the user's nose. When the sensor 452 senses that the nose pad frame 120 touches the user's nose, the SMA element 356 is actuated to move the fixing element 140 and allow the nose pad frame 120 to move. Therefore, as long as the user wears the wearable device 400 on the face, the sensor 452 can sense the user's wearing action and automatically activate the SMA element 356 to allow the nose pad frame 120 to move.

In the embodiment, when the sensor 452 senses that the force exerted by the user's nose on the nose pad frame 120 exceeds a preset value, the SMA element 356 is powered off to move the fixing element 140 and fix the nose pad frame 120. That is to say, when the bridge 112 is pushed to an appropriate height by the bridge of the user's nose, the force exerted by the user's nose on the nose pad frame 120 will exceed the preset value, and the SMA element 356 can automatically power off to move the fixing element 140 and fix the nose pad frame 120.

On the other hand, the switch module 450 may further includes a button 454, arranged on a temple 114 of the body 110 for the user to press to actuate the SMA element 356 to move the fixing element 140 and allow the nose pad frame 120 to move. That is to say, the user can start the operation of adjusting the height of the nose pad frame 120 by pressing the button 454. The operation of adjusting the height of the nose pad frame 120 can be started by pressing the button 454, but it can also be started according to the sensing result of the sensor 452, which is not limited in the application.

In summary, in the wearable device of the application, the bridge can move steplessly, so it can be pushed to an appropriate height by the bridge of the user's nose, and the bridge can be fixed by a fixing piece after moving to an appropriate height. Therefore, no matter the height of the nose bridge of the user is high or low, the nose pad frame can provide a comfortable wearing feeling and obtain a good viewing experience.

What is claimed is:

1. A wearable device, comprising:
a body, has a bridge;
a nose pad frame, movably arranged at the bridge;
a first elastic element, arranged between the bridge and the nose pad frame;
a clamping element, movably arranged at the bridge for fixing the nose pad frame or allowing the nose pad frame to move steplessly, and
a switch module assembled to the body to move the clamping element,
wherein the switch module comprises:
a first connecting rod has a pivot joint, a force receiving end and a connecting end, wherein the pivot joint pivots the body and is located between the force receiving end and the connecting end, the force receiving end is used to receive an external force to make the first connecting rod rotate; and a second connecting rod, its two ends are respectively connected to the connecting end and the clamping element, wherein the switch module further comprises a shape memory alloy element, connected between the body and the force receiving end for applying the external force to the force receiving end.

2. The wearable device according to claim 1, wherein the switch module further comprises a second elastic element, connected between the body and the force receiving end for resetting the first connecting rod when the shape memory alloy element is in a power-off state.

3. The wearable device according to claim 1, wherein the switch module further comprises a sensor, configured to sense whether the nose pad frame touches a user's nose, wherein when the sensor senses that the nose pad frame touches the user's nose, the shape memory alloy element is actuated to move the clamping element and allow the nose pad frame to move.

4. The wearable device according to claim 3, wherein when the sensor senses that the force exerted by the user's nose on the nose pad frame remains stable and lasts longer than a preset value, the shape memory alloy element is powered down to move the clamping element and fix the nose pad frame.

5. The wearable device according to claim 1, wherein the switch module further comprises a button, arranged on the body or a temple of the body, for a user to press to actuate the shape memory alloy element to move the clamping element and allow the nose pad frame to move.

6. The wearable device according to claim 1, wherein the switch module further comprises a second elastic element, connected between the body and the force receiving end for resetting the first connecting rod when the external force is not applied.

* * * * *